United States Patent
Manickam et al.

(10) Patent No.: US 9,201,141 B1
(45) Date of Patent: Dec. 1, 2015

(54) MULTIPLE SIMULTANEOUS TRANSMIT TRACK BEAMS USING PHASE-ONLY PATTERN SYNTHESIS

(75) Inventors: Arul Manickam, Mount Laurel, NJ (US); Peter G. Kaup, Marlton, NJ (US); David G. Loberger, Langhorne, PA (US)

(73) Assignee: Lockheed Martin Corporation, Bethesda, MD (US)

(*) Notice: Subject to any disclaimer, the term of this patent is extended or adjusted under 35 U.S.C. 154(b) by 665 days.

(21) Appl. No.: 13/548,433

(22) Filed: Jul. 13, 2012

(51) Int. Cl.
*G01S 13/72* (2006.01)
*G01S 7/41* (2006.01)
*G01S 13/00* (2006.01)

(52) U.S. Cl.
CPC . *G01S 13/72* (2013.01); *G01S 7/41* (2013.01); *G01S 13/726* (2013.01)

(58) Field of Classification Search
CPC ............ G01S 13/02; G01S 2013/0236; G01S 2013/0272; G01S 2013/029; G01S 13/04; G01S 13/06; G01S 13/42; G01S 13/422; G01S 13/424; G01S 13/44; G01S 13/4481; G01S 13/66; G01S 13/68; G01S 13/685; G01S 13/70; G01S 13/72; G01S 13/723; G01S 13/726; G01S 7/02; G01S 7/41
USPC ............. 342/27, 28, 59, 73–82, 89–103, 118, 342/146–157, 175, 192–197, 70, 350, 342/368–384; 367/87, 93, 94, 99, 100, 103
See application file for complete search history.

(56) References Cited

U.S. PATENT DOCUMENTS

| | | | | |
|---|---|---|---|---|
| 2,726,385 A | * | 12/1955 | Moore | 342/155 |
| 2,956,275 A | * | 10/1960 | Ashby | 342/149 |
| 3,130,402 A | * | 4/1964 | Kuck | 342/80 |
| 3,573,820 A | * | 4/1971 | Bohacek | 342/91 |
| 3,723,952 A | * | 3/1973 | Walsh | 367/100 |
| 3,747,100 A | * | 7/1973 | Gulick, Jr. | 342/380 |
| 3,943,512 A | * | 3/1976 | Dempsey | 342/80 |

(Continued)

FOREIGN PATENT DOCUMENTS

WO WO03/062852 A1 * 7/2003 ............. G01S 13/93

OTHER PUBLICATIONS

M. Mouhamadon and P. Vaudon, "Smart Antenna Array Patterns Synthesis: Null Steering and Multi-User Beamforming by Phase Control", from Progress in Electromagnetics Research, PIER 60, pp. 95-106, 2006.

(Continued)

*Primary Examiner* — Bernarr Gregory
(74) *Attorney, Agent, or Firm* — Howard IP Law Group, PC

(57) ABSTRACT

A radar tracking method and system is disclosed that improves radar resource utilization and increases Doppler resolution. The method includes tracking a primary target and a secondary target by directing a radar transmit signal main lobe at a primary target, the radar transmit signal main lobe having associated radar transmit signal side lobes, and receiving a main lobe radar return signal and side lobe radar return signals. A secondary target proximate to a first side lobe radar transmit signal is identified. Then, the primary target is tracked using the radar transmit signal main lobe and the main lobe radar return signal, and the secondary target is tracked using the first side lobe radar transmit signal proximate the secondary target and an independent side lobe return beam formed to align with the secondary target.

20 Claims, 8 Drawing Sheets

(56) References Cited

U.S. PATENT DOCUMENTS

| | | | |
|---|---|---|---|
| 5,400,035 A * | 3/1995 | Liu | 342/149 |
| 6,011,507 A * | 1/2000 | Curran et al. | 342/70 |
| 6,252,540 B1 * | 6/2001 | Hale et al. | 342/93 |
| 7,061,424 B2 * | 6/2006 | Kuroda et al. | 342/70 |
| 7,833,158 B2 * | 11/2010 | Bartz | 367/103 |
| 8,358,233 B2 * | 1/2013 | Foreman | 342/27 |

OTHER PUBLICATIONS

M. Comisso and R. Vescovo, "Multi-beam synthesis with null constraints by phase control for antenna arrays of arbitrary geometry", from Electronic Letters, vol. 43, No. 7; Mar. 29, 2007.

* cited by examiner

MULTIPLE SIMULTANEOUS TRANSMIT TRACK BEAMS USING PHASE-ONLY PATTERN SYNTHESIS

FIELD OF THE INVENTION

The present invention relates to radar tracking, and more particularly to a method and system for tracking multiple targets with multiple simultaneous track beams using phase-only pattern synthesis.

BACKGROUND OF THE INVENTION

Radar resource utilization is a high priority in military radars. Radar is used to scan for new threats as well as to keep track of already identified threats. Conserving radar resource utilization in one application can free up the radar for other applications.

Simultaneous tracking of multiple targets has been implemented in primarily four ways in the past: 1) tracking one target for a single pulse or dwell and then quickly switching to one or more additional targets; 2) beamspoiling on transmit and forming multiple receive beams; 3) partitioning the array faces into different subapertures and then forming a different transmit beam out of each subaperture; and 4) shotgunning, which is transmitting different pulses to multiple targets and then simultaneously receiving pulses back from all targets. Method one results in high track resource utilization, which limits the number of other operations (such as search) that can be scheduled for a radar. Method 2 can be effective for searching a large volume, but beamspoiling the transmit beam results in a large amount of wasted energy being sent to angles where targets are not present. Method three uses lower power and lower gain, resulting in decreased sensitivity and decreased angular resolution. Finally, while the shotgunning method is sometimes effective, on its own it may not be effective if the radar is not able to quickly switch from transmitting one pulse to the next.

FIG. 1 shows a typical prior art radar approach used to track targets. The radar 10 emits a transmit beam with a main lobe 20 aimed at primary target 15 and sidelobes 25. The sidelobes 25 are all of the lobes other than the main lobe, and are effectively wasted energy, as the prior art method requires a separate main lobe to be aimed at the secondary target in order for the secondary target 30 to be tracked. The use of a new main lobe for each target consumes significant radar resources, and each new main lobe has associated wasted sidelobe energy that is not utilized.

FIG. 2 shows another typical prior art radar method used to track targets. In this prior art embodiment, beamspoiling is used to cause the radar 10 to effect a wide transmit beam pattern 50. Individual receive beams 55 may be digitally formed in the direction of known targets. The wide transmit beam pattern can detect a primary target 15 as well as secondary targets 30, but significant radar resources are wasted because the wide transmit beam sends energy in all directions regardless of where the targets are. In addition, as is known in the art, beamspoiling results in a loss of gain, therefore longer dwell times are needed using this prior art method.

Thus, a system and method is needed for tracking multiple targets that reduces radar resource utilization, that wastes less energy by minimizing transmit beams to angles where there are no targets, which has acceptable sensitivity and angular resolution, and which is usable in a variety of situations.

SUMMARY OF THE INVENTION

A system and method for tracking multiple targets using phase-only pattern synthesis is disclosed.

The method for tracking a primary target and a secondary target using radar comprises directing a radar transmit signal main lobe at a primary target, the radar transmit signal main lobe having associated radar transmit signal side lobes, and receiving a main lobe radar return signal and side lobe radar return signals. A secondary target proximate to a first side lobe radar transmit signal is identified. Then, the primary target is tracked using the radar transmit signal main lobe and the main lobe radar return signal, and the secondary target is tracked using the first side lobe radar transmit signal proximate the secondary target and an independent side lobe return beam formed to substantially align with the secondary target.

In an embodiment, the method may also include steering the first side lobe radar transmit signal proximate the secondary target to increase alignment with the secondary target. In another embodiment, the method may further comprise adjusting an amplitude of the first side lobe radar transmit signal so that an adequate first side lobe return signal is received. Steering the radar transmit signal side lobe is performed using phase-only pattern synthesis. The method may also include increasing a dwell time for the radar transmit signal main lobe.

The method may further comprise, after identifying the secondary target, comparing a secondary target return signal strength with a primary target return signal strength, and if the primary target return signal strength is greater than the secondary target return signal strength, designating the secondary target as the primary target and the primary target as the secondary target, thereby enabling the radar to track a weaker return signal target with the main lobe transmit signal and a stronger return signal target with the side lobe transmit signal.

In another embodiment, the method may be for tracking a primary target and a plurality of secondary targets. The method comprises directing a radar transmit signal main lobe at the primary target, the radar transmit signal main lobe having associated radar transmit signal side lobes. Then a main lobe radar return signal and side lobe radar return signals are received and the plurality of secondary targets are identified, wherein each of the plurality of secondary targets is proximate to a side lobe radar transmit signal. The primary target is tracked using the radar transmit signal main lobe and the main lobe radar return signal. Then one or more of the plurality of secondary targets is tracked using the side lobe radar transmit signal proximate to each of the plurality of secondary targets and an independent side lobe return beam formed to substantially align with each of the one or more of the plurality of secondary targets.

The method may also comprise steering a first side lobe radar transmit signal associated with at least one of the one or more of the plurality of secondary targets to better align the first side lobe radar transmit signal with the at least one of the one or more of the plurality of secondary targets. In an embodiment, the method also comprises adjusting an amplitude of the first side lobe radar transmit signal associated with at least one of the one or more of the plurality of secondary targets until an adequate first side lobe return signal is received. Steering the side lobe radar transmit signal is performed using phase-only pattern synthesis. The method also may include increasing a dwell time for the radar transmit signal main lobe.

In another embodiment, the method includes, after identifying the plurality of secondary targets, comparing a strength of each of the one or more of the plurality of secondary targets return signal with the primary target return signal strength, and if the primary target return signal strength is greater than the strength of one of the one or more of the plurality of secondary targets return signal, designating the one of the plurality of secondary targets with a weaker signal strength as the primary target and the primary target as the one of the plurality of secondary targets, thereby enabling the radar main lobe to track a weaker return signal target.

An embodiment of the method may also comprise forming an independent side lobe return beam for a second secondary target of the plurality of secondary targets, wherein the second secondary target independent side lobe return beam aligns with the second secondary target. Then a side lobe radar transmit signal associated with the second secondary target of the plurality of secondary targets is steered to better align the second side lobe radar transmit signal with the second secondary target. In addition, the amplitude of the second side lobe radar transmit signal is adjusted until an adequate second side lobe return signal is received.

A system for tracking a primary target and a plurality of secondary targets is also disclosed. It comprises a radar and a radar beam controller. The radar beam controller is operative for directing a radar transmit signal main lobe at the primary target, the radar transmit signal main lobe having associated radar transmit signal side lobes. The radar beam controller also receives a main lobe radar return signal and side lobe radar return signals, and identifies the plurality of secondary targets, wherein each of the plurality of secondary targets is proximate to a side lobe radar transmit signal. The radar beam controller then tracks, using the radar, the primary target using the radar transmit signal main lobe and the main lobe radar return signal, and tracks at least one of the plurality of secondary targets using the side lobe radar transmit signal proximate to the at least one of the plurality of secondary targets and an independent side lobe return beam formed to align with the at least one of the plurality of secondary targets The radar beam controller of the system may be further operative for forming using the radar an independent side lobe return beam for a second secondary target of the plurality of secondary targets, wherein the second secondary target independent side lobe return beam aligns with the second secondary target. The radar beam controller may also be operative for steering a second side lobe radar transmit signal of the radar associated with a second secondary target of the plurality of secondary targets to better align the second side lobe radar transmit signal with the second secondary target; and adjusting an amplitude of the second side lobe radar transmit signal of the radar until an adequate second side lobe return signal is received.

DETAILED DESCRIPTION

This invention provides a method for tracking multiple targets while minimizing radar resources and increasing Doppler sensitivity.

Figure 1:
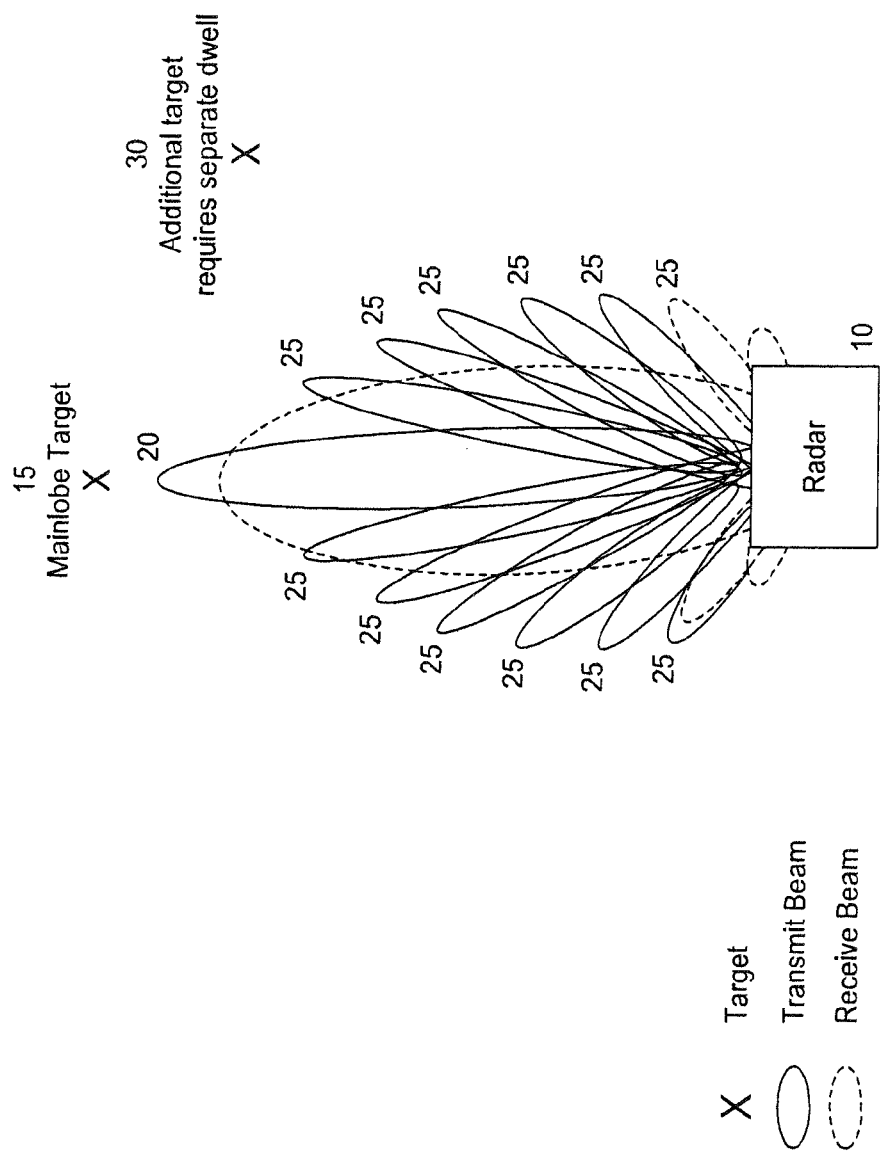
FIG. 1 is a notional representation of a prior-art system for tracking multiple targets.
Figure 2:
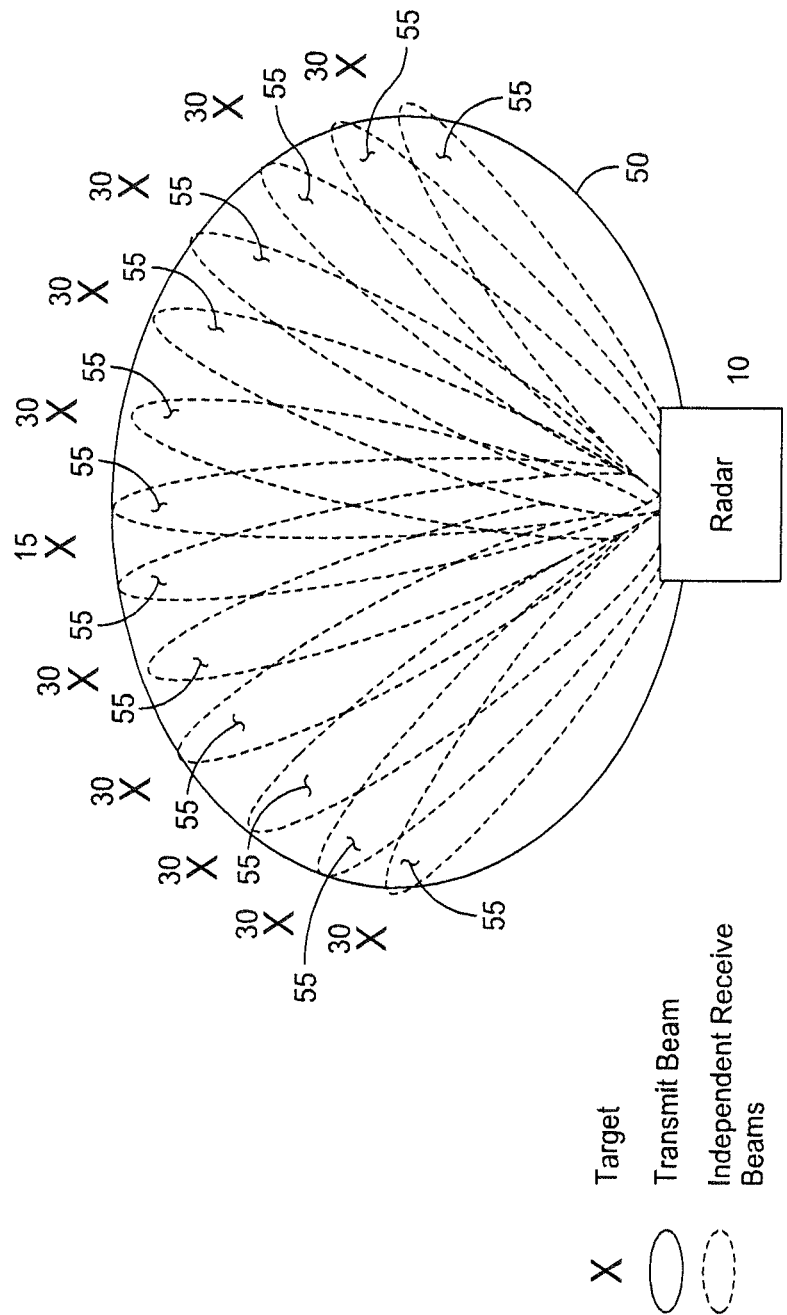
FIG. 2 is a notional representation of a prior-art system for tracking multiple targets.
Figure 3:
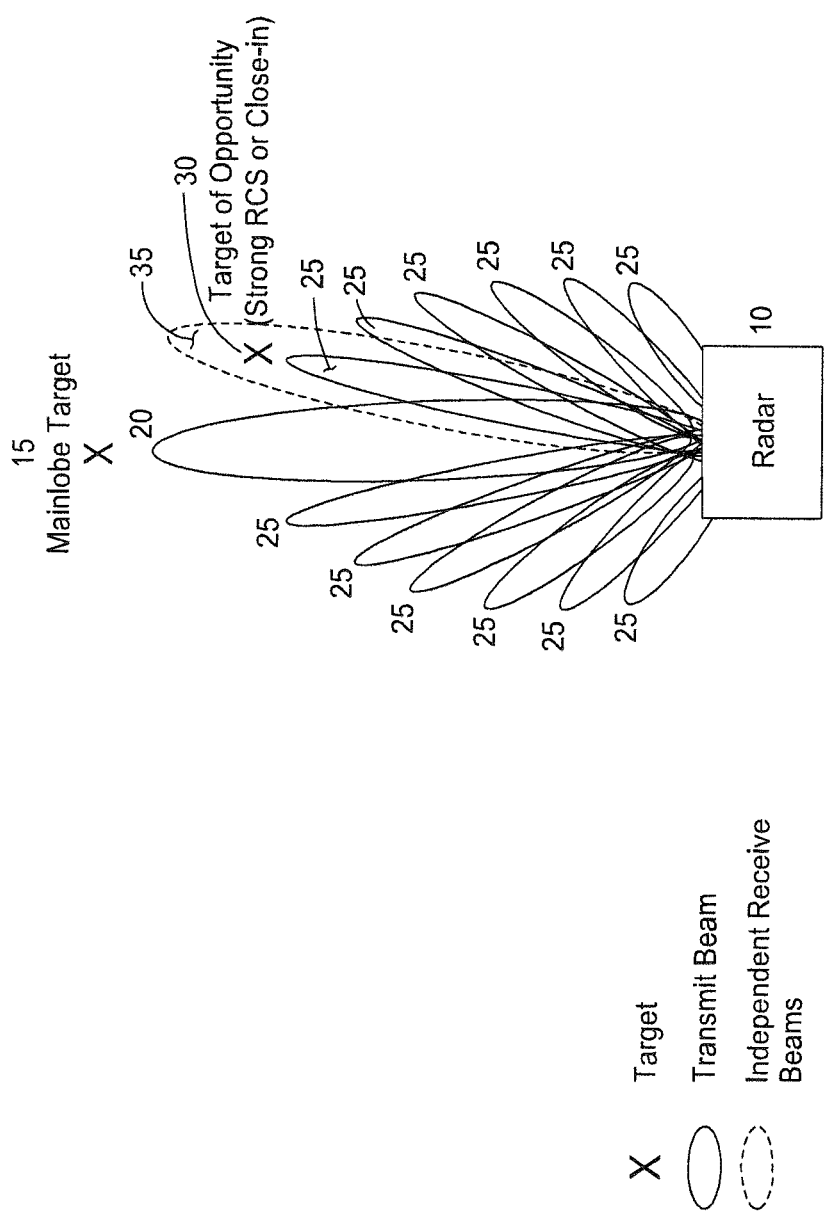
FIG. 3 is a notional representation of a method for tracking multiple targets according to an embodiment of the disclosure.

FIG. 3 shows a notional representation of a method for tracking multiple targets according to an embodiment of the disclosure. Radar 10 is configured to emit a standard radar transmit signal with a main lobe 20 directed at the primary target 15 and associated sidelobes 25. If a secondary target 30 is identified as being within a sidelobe 25 and has a strong return signal (e.g., because it has a large radar cross section or because it is close to the radar), an independent digital receive beam 35 may be formed in the direction of the secondary target, to substantially align with the secondary target. In this way, a primary target and a secondary target may be tracked in the same time that a single primary target would be tracked. Thus, this method avoids tracking using the prior art method of tracking each target with a separate main lobe. This method also avoids the wasted energy associated with the prior art method of beamspoiling the transmit signal.

Figure 4:
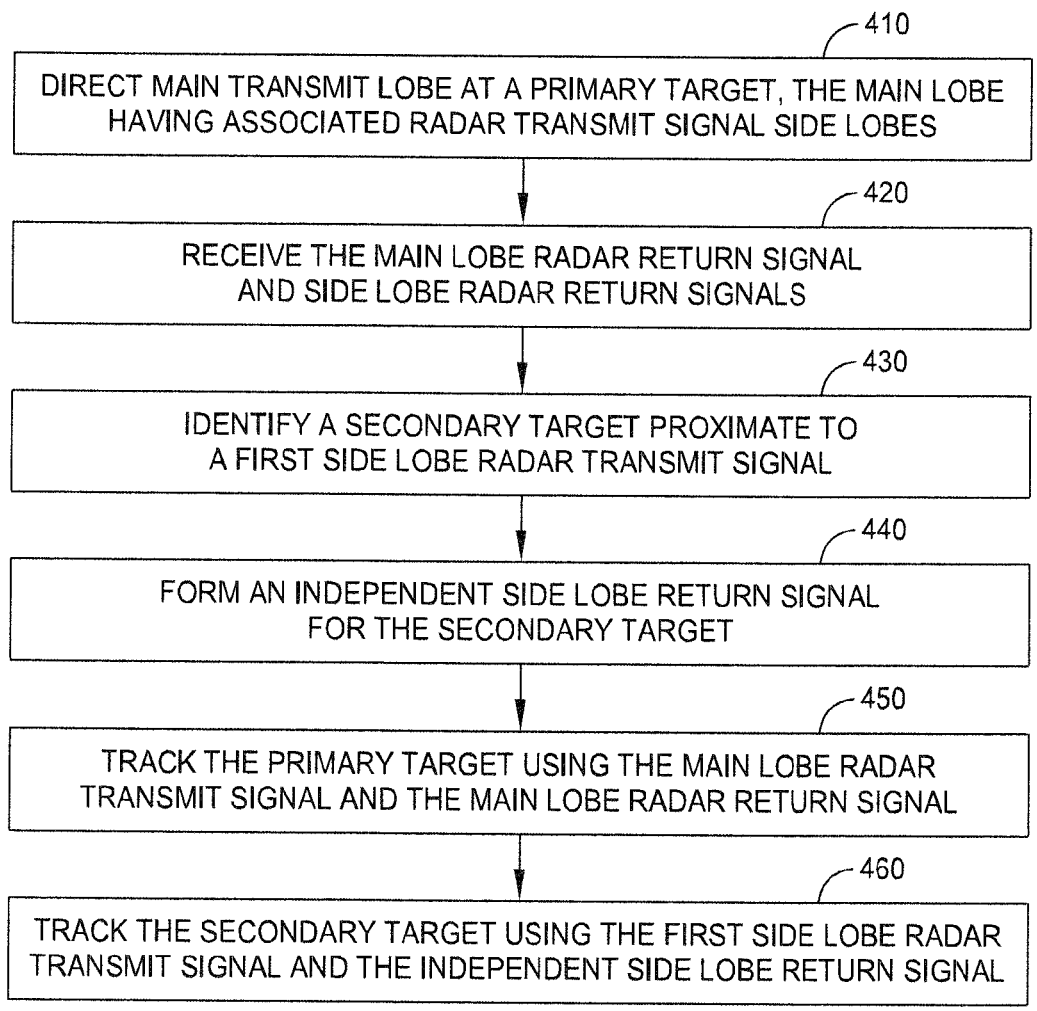
FIG. 4 is a flowchart illustrating steps according to an embodiment of the disclosure.

FIG. 4 shows a flowchart illustrating steps according to the embodiment shown in FIG. 3. The method begins at step 410, in which the radar directs a main lobe at a primary target. As shown in FIG. 3, the main lobe has associated side lobes. At step 420, the main lobe return signal is received, as well as the return signals for the side lobes associated with the main lobe. After the return signals are received, the side lobe return signals are reviewed by the radar controller for secondary targets with a strong return signal in step 430. If a secondary target with a strong return signal is identified, an independent side lobe return signal is formed for the secondary target in step 440. As shown in FIG. 3, the independent side lobe return signal is formed in the direction of the sidelobe that detected the secondary target, to substantially align with the secondary target. Then in step 450, the primary target is tracked using the main lobe transmit and return signals. In step 460, the secondary target is tracked using the sidelobe radar transmit signal and the independent side lobe return signal formed for the identified secondary target.

Figure 5:
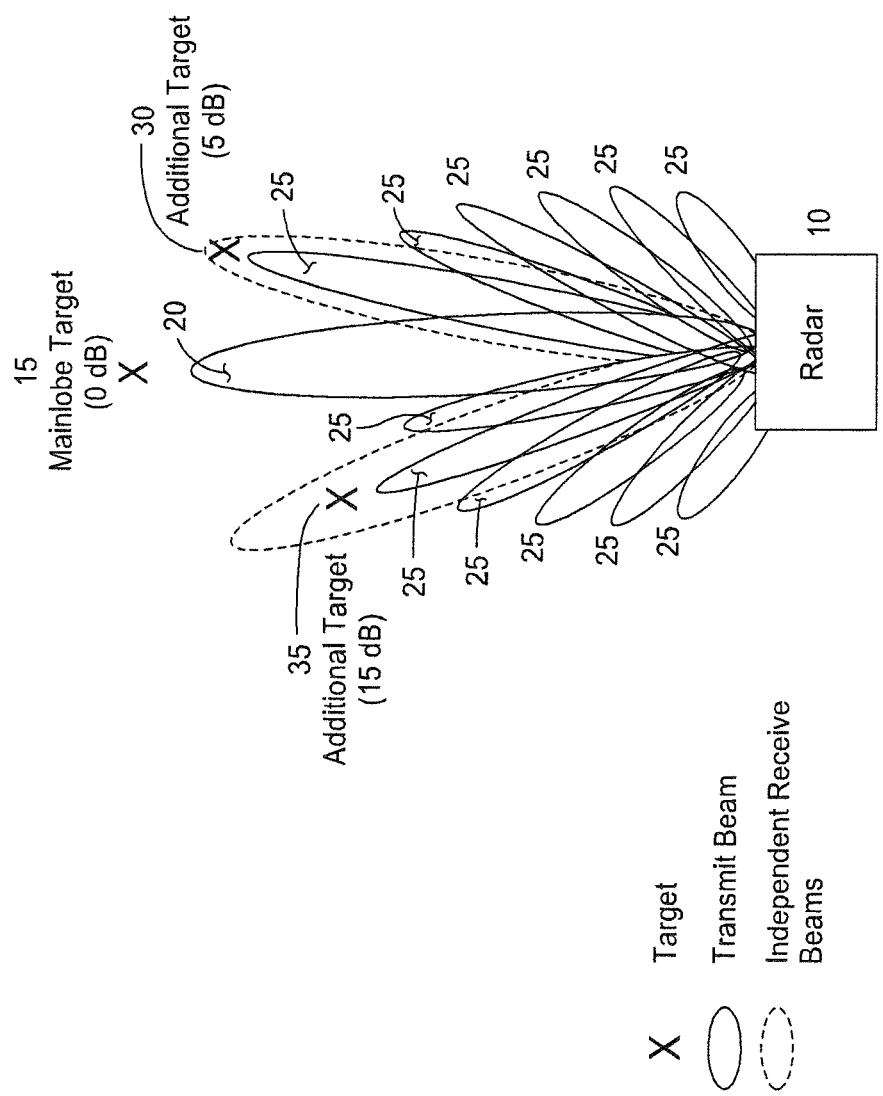
FIG. 5 is a notional representation of a method for tracking multiple targets according to an embodiment of the disclosure.

FIG. 5 shows a notional representation of a method for tracking multiple targets according to an embodiment of the disclosure. Radar 10 is configured to emit a standard radar transmit signal with a main lobe 20 directed at the primary target 15 and associated sidelobes 25. If a secondary target 30 or 35 is identified as being within a sidelobe 25, the sidelobe 25 may be steered using phase-only pattern synthesis (POPS) to provide a better alignment between the target and the sidelobe, which will result in a stronger return signal. In addition, the amplitude of the sidelobe transmit signal may be adjusted (as shown in relation to secondary target 30) so that an adequate return signal is obtained. An independent receive beam is formed for each secondary target that is to be tracked with a sidelobe, with each independent receive beam substantially aligned with the secondary target it is being used to track. In this way, a primary target and a secondary target may be tracked in the same time that a single primary target would be tracked, using a sidelobe transmit signal and an independent receive beam. As will be understood, not all secondary targets within signal range of the radar need to be tracked using side lobes, and a user may select those secondary targets having certain characteristics, for example a minimum threshold return, as viable candidates for tracking with side lobes. Thus, this method avoids tracking using the prior art method of tracking each target with a separate main lobe. This method also avoids the wasted energy associated with the prior art method of beamspoiling the transmit signal. Using POPS to steer sidelobes may cause some loss of gain in the main lobe, but that loss can be recovered by increasing the dwell time of the main lobe transmit signal.

Figure 6:
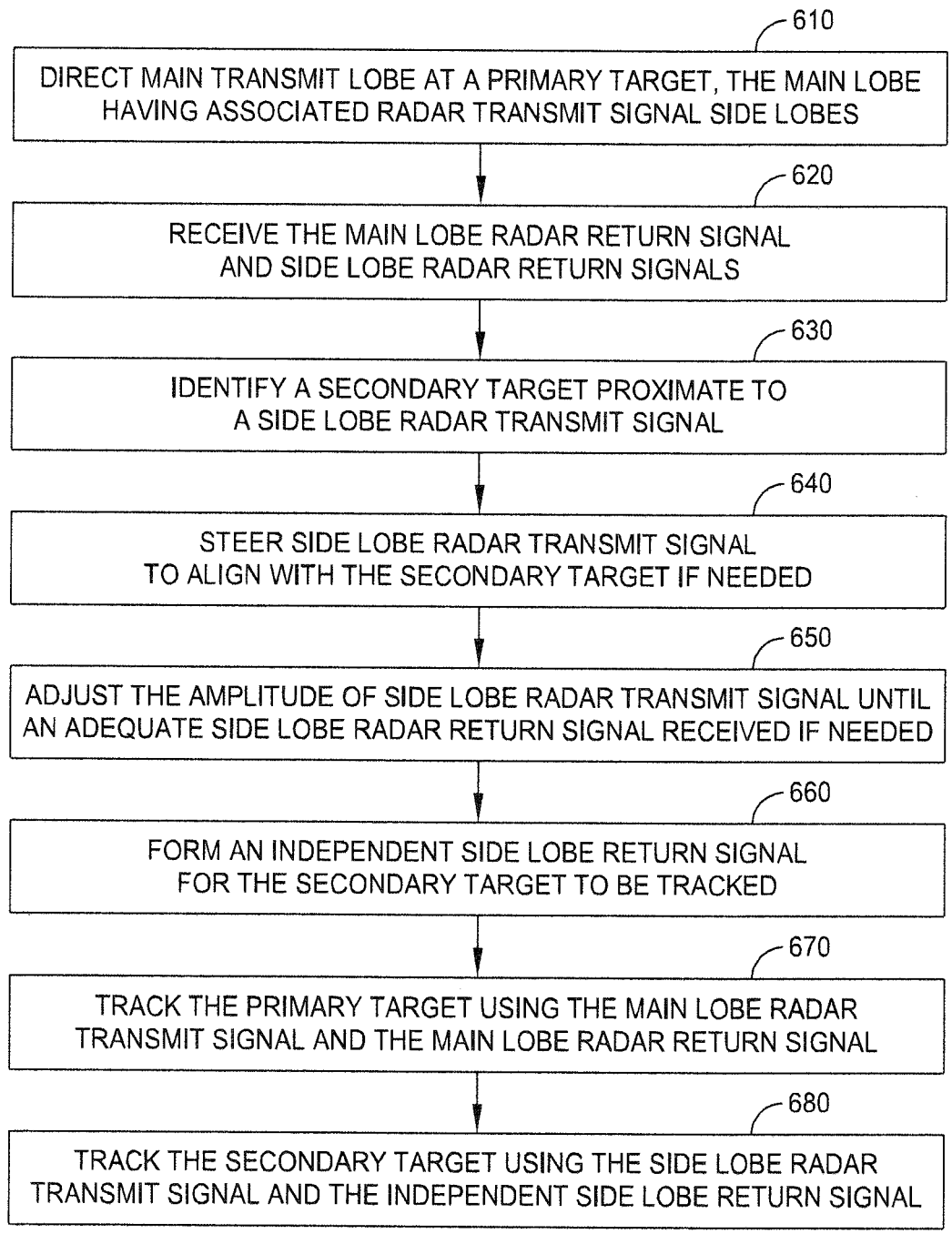
FIG. 6 is a flowchart illustrating steps according to an embodiment of the disclosure.

FIG. 6 shows a flowchart illustrating steps according to the embodiment shown in FIG. 5, in which one of the secondary targets is tracked according to an embodiment of the invention. The method begins at step 610, in which the radar directs a main lobe at a primary target. As shown in FIG. 5, the main lobe has associated side lobes. At step 620, the main lobe return signal is received, as well as the return signals for the side lobes associated with the main lobe. After the return signals are received, the side lobe return signals are reviewed by the radar controller for a secondary target with a strong return signal in step 630. A secondary target with a strong return signal is identified and, as shown in step 640, the sidelobe transmit signal closest to the identified secondary target may be steered towards the secondary target, if necessary, to better enable tracking of the secondary target. Where the sidelobe transmit signal for the identified secondary target is already substantially aligned, steering may not be needed. Steering the sidelobe signal may be performed by phase-only pattern synthesis to redirect the sidelobe signal so that, ideally, it is aligned with the secondary target. As will be understood by one skilled in the art, alignment of the sidelobe signal with the secondary target results in a stronger return signal, although exact alignment is not necessary. In step 650, the amplitude of the sidelobe transmit signal may be adjusted, if needed, to effect an adequate sidelobe return signal. As will be understood, the amount of amplitude adjustment will depend on the strength of the return signal from the secondary target without amplitude adjustment, and amplitude adjustment may not always be needed. Thus, secondary targets that present a strong return signal to the radar (such as targets with a large radar cross section or targets that are close to the radar) may require less or no transmit signal amplification to obtain an adequate return signal than secondary targets that return a weaker return signal, which may need greater amplification. In step 660, an independent side lobe return signal is formed for the identified secondary target to be tracked. As will be understood, step 660 may be performed any time after the secondary targets are identified in step 630, and does not necessarily have to be performed after the steering and amplitude steps, although it may be. After steering and amplitude adjustment are performed, if needed, and after formation of the independent side lobe return signal is performed, the primary and secondary targets may be tracked. As shown in step 670, the primary target is tracked with the main lobe radar transmit signal and the main lobe radar return signal. As shown in step 680, the secondary target is tracked with the sidelobe radar transmit signal (that may have been steered and adjusted in amplitude if needed) and the independent sidelobe return signal that was formed to align with the secondary target.

As noted, phase-only pattern synthesis (POPS) is a technique for steering the sidelobes. The technique works by applying a phase distortion across the antenna elements of the radar to vary the radar's transmit pattern. A method for performing POPS in is described in the publication Progress in Electromagnetics Research, PIER 60, 95-106 (2006). Another method is described in Electronics Letters, Vol. 43, No. 7 (Mar. 29, 2007), and as will be understood, other POPS implementations may be used After POPS has been applied to the secondary transmit signals, individually weighted digital receive beams with full aperture gain and low sidelobes are formed for each secondary target being tracked. The resulting 2-way beam (transmit and receive) for each individual target allows each individual target return to be isolated from all others because of the low receive beam sidelobes. In this way, multiple targets can be simultaneously tracked. Increased angular resolution of targets being tracked with sidelobes may occur as a result of tracking using lower gain sidelobes with smaller sidelobe widths, although some or all of that increased angular resolution may be offset by widening of the sidelobes that may result from POPS, depending on the application.

Notably, in both embodiments shown in FIGS. 3 and 4 and FIGS. 5 and 6, it may be desirable to use the main lobe to track targets that have a weaker return signal and the sidelobes to track targets that have a stronger return signal. As known in the art, the sidelobe transmit signals inherently are weaker than the main lobe signal. Accordingly, using the sidelobes to track targets that have a stronger return signal (e.g., if the target is closer to the radar or if it has a larger radar cross section) than the other targets being tracked compensates for this weakness. Correspondingly, tracking a target with a comparatively weaker return signal (compared to the other targets being tracked) with the main lobe enables better tracking of the target than would be possible with a sidelobe. In the embodiment of FIG. 4, this could be accomplished after the secondary target is identified in step 430, by assessing the strength of the primary target return signal compared to the secondary target return signal, and if the secondary target return signal is weaker, designating the primary target as the secondary target and the secondary target as the primary target. This similar step can be performed in the embodiment of FIG. 6 after the secondary target is identified in step 630. In an embodiment, the weakest targets (targets having weakest radar detectability) are tracked with the strongest transmit signals and the strongest targets are tracked with the weakest transmit signals, such that the strength of the sidelobes used is inversely proportional to targets' detectability.

As will be understood by a person with ordinary skill in the art, the methods of the embodiments may be used to track more than one secondary target. That is, in either of the embodiments of FIG. 4 or 6, the step of identifying a secondary target may be substituted with the step of identifying more than one secondary target, and then tracking those secondary targets using sidelobe transmit and return signals. Practically speaking, the number of the secondary targets that may be tracked will depend on the power of the radar being used. By way of example, in an embodiment the sidelobes immediately adjacent to the main lobe may have a 12-13 db reduction in power from the main lobe. As will be understood, the sidelobes adjacent to those sidelobes will have a further reduction in power, likely less than 12-13 db, but nevertheless a reduction. This continuing reduction in power of the sidelobes reduces the usability of "further" sidelobes to track secondary targets unless the secondary targets are very close or have large radar cross sections that make them easier to track.

Figure 7:
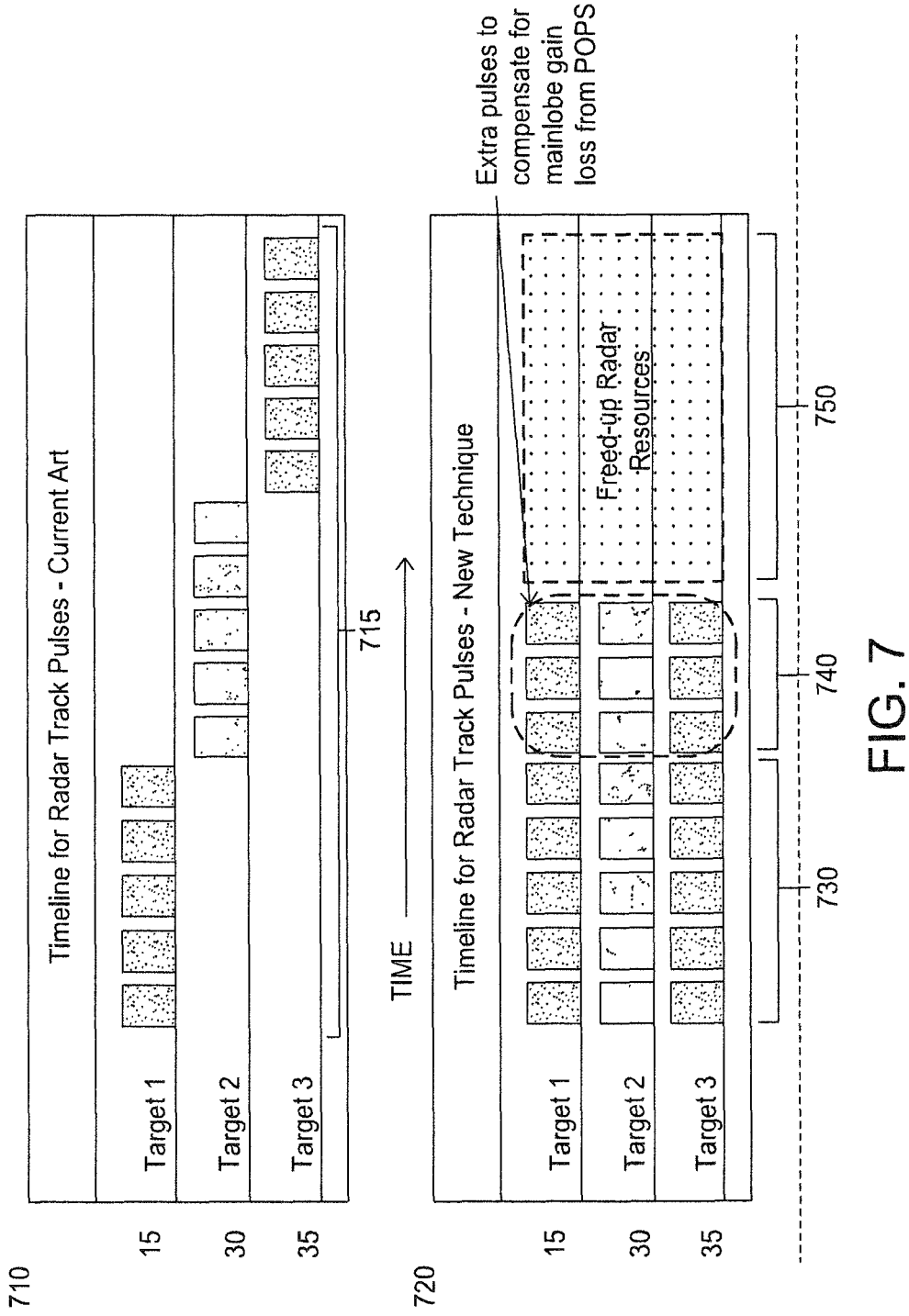
FIG. 7 is a notional representation of radar resource utilization according to the prior art and the method according to aspects of the disclosure.

FIG. 7 is a notional representation of radar resource utilization according to the prior art and the method according to aspects of the disclosure. As shown in block 710 of FIG. 7, prior art radar track pulse utilization consisted of sequential tracking of targets. Thus, a first target (Target 1 (15)) might be tracked using 5 pulses, then a second target (Target 2 (30)) might be tracked using 5 pulses, and then a third target (Target 3 (35)) might be tracked using 5 pulses. Because of this sequential tracking, the radar uses over 15 pulses of time 715 to track three targets and is unavailable for other uses during those 15 pulses.

In contrast, as shown in block 720 of FIG. 7, the three targets can be tracked over a shorter period of time using the embodiments disclosed because targets two and three can be tracked using the sidelobes of the main lobe pulses used to track target one. In an embodiment as shown in FIG. 4 in which the secondary targets Target 2 (3) and Target 3 (35) are aligned with sidelobes so that sidelobe steering is not necessary, it may be possible that the three targets can be tracked using 5 radar pulses (730), freeing up 10 radar pulses of time to use the radar for other purposes. In an embodiment as shown in FIG. 6 in which sidelobe steering and transmit signal amplitude adjustment are needed, the main lobe that is used to track target one may experience a loss in gain. That loss in gain may require additional pulses to be used (to increase dwell time) as shown in block 720, which shows three extra pulses (740) being used to compensate for the main lobe gain loss from steering using POPS. Nevertheless, even if three additional pulses are needed, use of the embodiment still frees up 7 pulses (750) worth of radar resources for other purposes.

Figure 8:
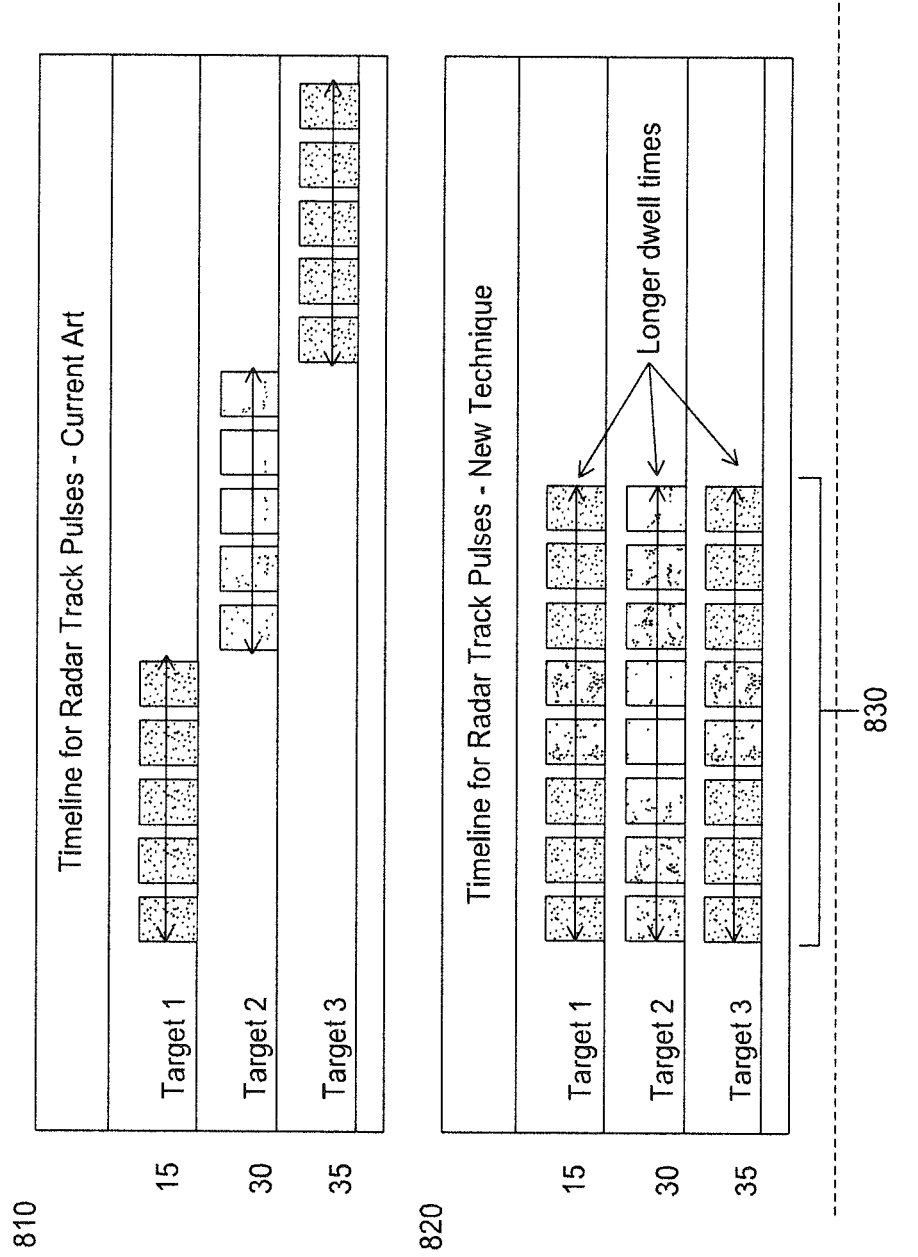
FIG. 8 is a notional representation of Doppler resolution according to the prior art and a method according to aspects of the disclosure.

Another advantage of the methods of the invention is shown in FIG. 8, which is a notional representation of Doppler resolution according to the prior art (810) and a method according to aspects of the disclosure (820). As noted in relation to block 720 of FIG. 7, additional pulses may be needed to compensate for gain loss experienced by the main lobe if POPS is used to steer one or more sidelobes. As is known in the art, Doppler resolution improves with longer dwell times. Therefore, because in an embodiment the invention uses longer dwell times 830 for each target (8 pulse dwell times as shown in block 820) than were used in the prior art for each target (5 pulse dwell times as shown in block 810), Doppler resolution is improved. Notably, although the dwell time for a specific target may be longer, the overall time the radar resources are used to track multiple targets may be reduced as discussed in relation to FIG. 7. In the example shown in FIGS. 7 and 8, a reduction of 7 pulses may be realized over the 15 pulses required to track the three targets using the current art. A reduction in overall use of the radar improves the radar's resistance to electronic attack by a defensive system that is trying to jam or otherwise render the radar ineffective because the reduction in radar use corresponds to reduced signal energy for the defensive system to receive, measure, and respond to. For example, improved control over the transmit energy and reduced transmit energy by the embodiments of the invention reduces the energy available to responsive jammers. In addition, the reduced signal energy by the radar may also increase the ability to spoof the EA system.

As will be understood, radar antenna systems known in the art may be used to perform embodiments of the invention. These radar antenna systems may include hardware, software, firmware, memory, controllers, and/or processors to control all aspects of the radar such as beam formation, beam steering, amplitude, and phase control of the transmit or receive beams. A phased array antenna system is an example of one type of system that may be used to perform embodiments of the invention.

The embodiments of the invention described herein may also be preferable in close-in scenarios involving a number of targets that present strong radar profiles that can be tracked with lower power side lobes. Thus, while some radars operate in low power mode when tracking close-in targets, it may be preferable to operate the radar in high power and spread that power among multiple targets simultaneously using the embodiments described herein.

What is claimed is:

1. A method for tracking a primary target and a secondary target using radar comprising:
   directing, by a radar controller controlling the radar, a radar transmit signal main lobe at the primary target, the radar transmit signal main lobe having associated radar transmit signal side lobes;
   receiving, by the radar, a main lobe radar return signal and side lobe radar return signals;
   identifying, by the radar controller, the secondary target proximate to a first side lobe radar transmit signal;
   tracking, by the radar controller using the radar, the primary target using the radar transmit signal main lobe and the main lobe radar return signal; and
   tracking, by the radar controller using the radar, the secondary target using the first side lobe radar transmit signal proximate the secondary target and an independent side lobe return beam formed to substantially align with the secondary target.

2. The method of claim 1, wherein tracking the secondary target using the first side lobe radar transmit signal proximate the secondary target and the independent side lobe return beam comprises steering, by the radar controller using the radar, the first side lobe radar transmit signal proximate the secondary target to increase alignment with the secondary target.

3. The method for tracking of claim 2, wherein steering the radar transmit signal side lobe is performed using phase-only pattern synthesis.

4. The method for tracking of claim 3, further comprising increasing, by the radar controller using the radar, a dwell time for the radar transmit signal main lobe.

5. The method of claim 1, wherein tracking the secondary target using the first side lobe radar transmit signal proximate the secondary target and the independent side lobe return beam comprises adjusting, by the radar controller using the radar, an amplitude of the first side lobe radar transmit signal so that an adequate first side lobe return signal is received.

6. The method of claim 5, wherein tracking the secondary target using the first side lobe radar transmit signal proximate the secondary target and the independent side lobe return beam further comprises steering, by the radar controller using the radar, the first side lobe radar transmit signal proximate the secondary target to increase alignment with the secondary target.

7. The method for tracking of claim 1, further comprising, after identifying the secondary target, comparing, by the radar controller, a secondary target return signal strength with a primary target return signal strength, and when the primary target return signal strength is greater than the secondary target return signal strength, designating, by the radar controller, the secondary target as the primary target and the primary target as the secondary target, thereby enabling the radar to track a weaker return signal target with the main lobe transmit signal and a stronger return signal target with the side lobe transmit signal.

8. A method for tracking a primary target and a plurality of secondary targets using radar comprising:
   directing, by a radar controller controlling the radar, a radar transmit signal main lobe at the primary target, the radar transmit signal main lobe having associated radar transmit signal side lobes;
   receiving, by the radar, a main lobe radar return signal and side lobe radar return signals;
   identifying, by the radar controller, the plurality of secondary targets, wherein each of the plurality of secondary targets is proximate to a side lobe radar transmit signal;

tracking, by the radar controller using the radar, the primary target using the radar transmit signal main lobe and the main lobe radar return signal; and tracking, by the radar controller using the radar, one or more of the plurality of secondary targets using the side lobe radar transmit signal proximate to each of the one or more of the plurality of secondary targets and an independent side lobe return beam formed to substantially align with each of the one or more of the plurality of secondary targets.

9. The method of claim 8, wherein tracking the one or more of the plurality of secondary targets using the side lobe radar transmit signal proximate to each of the one or more of the plurality of secondary targets and an independent side lobe return beam formed to align with each of the one or more or the plurality of secondary targets comprises steering, by the radar controller using the radar, a first side lobe radar transmit signal associated with at least one of the one or more of the plurality of secondary targets to better align the first side lobe radar transmit signal with the at least one of the one or more of the plurality of secondary targets.

10. The method for tracking of claim 9, wherein steering, by the radar controller using the radar, the side lobe radar transmit signal is performed using phase-only pattern synthesis.

11. The method for tracking of claim 10, further comprising increasing, by the radar controller using the radar, a dwell time for the radar transmit signal main lobe.

12. The method of claim 8, wherein tracking the one or more of the plurality of secondary targets using the side lobe radar transmit signal proximate to each of the plurality of secondary targets and an independent side lobe return beam formed to align with each of the one or more of the plurality of secondary targets comprises adjusting, by the radar controller using the radar, an amplitude of a first side lobe radar transmit signal associated with at least one of the one or more of the plurality of secondary targets until an adequate first side lobe return signal is received.

13. The method of claim 12, wherein tracking one or more of the plurality of secondary targets using the side lobe radar transmit signal proximate to each of one or more of the plurality of secondary targets and an independent side lobe return beam formed to align with each of the one or more of the plurality of secondary targets further comprises steering, by the radar controller using the radar, a first side lobe radar transmit signal associated with at least one of the one or more of the plurality of secondary targets to better align the first side lobe radar transmit signal with the at least one of the one or more of the plurality of secondary targets.

14. The method of claim 13, further comprising:
steering, by the radar controller using the radar, at least a second side lobe radar transmit signal associated with a second secondary target of the plurality of secondary targets to better align the second side lobe radar transmit signal with the second secondary target;
adjusting, by the radar controller using the radar, an amplitude of the second side lobe radar transmit signal until an adequate second side lobe return signal is received.

15. The method for tracking of claim 14, wherein steering the second side lobe radar transmit signal is performed using phase-only pattern synthesis.

16. The method for tracking of claim 15, further comprising increasing, by the radar controller using the radar, a dwell time for the radar transmit signal main lobe.

17. The method for tracking of claim 8, further comprising, after identifying the plurality of secondary targets, comparing a strength of the return signal of each of the one or more of the plurality of secondary targets to be tracked with the primary target return signal strength, and when the primary target return signal strength is greater than the signal return strength of any of the one or more of the plurality of secondary targets, designating, by the radar controller, one of the one or more of the plurality of secondary targets having a weaker signal return strength as the primary target and the primary target as the one of the one or more of the plurality of secondary targets, thereby enabling the radar main lobe to track a weaker return signal target.

18. A system for tracking a primary target and a plurality of secondary targets comprising:
a radar; and
a radar controller operative for:
directing the radar to transmit a radar transmit signal main lobe at the primary target, the radar transmit signal main lobe having associated radar transmit signal side lobes;
directing the radar to receive a main lobe radar return signal and side lobe radar return signals;
identifying the plurality of secondary targets, wherein each of the plurality of secondary targets is proximate to a side lobe radar transmit signal;
directing the radar to track the primary target using the radar transmit signal main lobe and the main lobe radar return signal; and
directing the radar to track at least one of the plurality of secondary targets using the side lobe radar transmit signal proximate to the at least one of the plurality of secondary targets and an independent side lobe return beam formed to align with the at least one of the plurality of secondary targets.

19. The system of claim 18, wherein the radar controller is further operative for directing the radar to form an independent side lobe return beam for a second secondary target of the plurality of secondary targets, wherein the second secondary target independent side lobe return beam aligns with the second secondary target.

20. The system of claim 18, wherein the radar controller is further operative for:
directing the radar to steer a second side lobe radar transmit signal of the radar associated with a second secondary target of the plurality of secondary targets to better align the second side lobe radar transmit signal with the second secondary target; and
directing the radar to adjust an amplitude of the second side lobe radar transmit signal of the radar until an adequate second side lobe return signal is received.

* * * * *